(12) United States Patent
Paul et al.

(10) Patent No.: US 9,112,583 B2
(45) Date of Patent: *Aug. 18, 2015

(54) MITIGATING AUDIBLE CROSS TALK (71) Applicant: Symbol Technologies, Inc., Schaumburg, IL (US)

(72) Inventors: Christopher Paul, Bayport, NY (US); David T. Lundquist, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 331 days.

This patent is subject to a terminal disclaimer.

(21) Appl. No.: 13/768,678

(22) Filed: Feb. 15, 2013

(65) Prior Publication Data

US 2014/0236589 A1    Aug. 21, 2014

(51) Int. Cl.
*H04R 1/10* (2006.01)
*G10L 21/0208* (2013.01)
*G10K 11/16* (2006.01)
*H04B 3/32* (2006.01)

(52) U.S. Cl.
CPC ........................................ *H04B 3/32* (2013.01)

(58) Field of Classification Search
CPC ...... G10L 21/0208; G10K 11/16; H04R 3/00; H04R 1/1008; H04R 2201/107; H04R 2430/01; G06F 1/3203
USPC ................ 320/162; 327/382, 551; 340/573.4; 348/241; 381/71.1, 71.6, 74, 81, 94.5, 381/107, 87, 120, 330; 455/293, 501; 704/203, 226; 713/300
See application file for complete search history.

(56) References Cited

U.S. PATENT DOCUMENTS

| 5,400,406 | A | | 3/1995 | Heline et al. | |
| 5,426,703 | A | * | 6/1995 | Hamabe et al. | 381/71.12 |
| 5,745,859 | A | * | 4/1998 | Takenaka | 455/575.2 |
| 5,978,689 | A | | 11/1999 | Tuoriniemi et al. | |
| 6,470,197 | B1 | | 10/2002 | Tuoriniemi et al. | |
| 7,089,177 | B2 | * | 8/2006 | Burnett et al. | 704/203 |
| 7,467,307 | B2 | * | 12/2008 | Kano | 713/300 |
| 7,706,821 | B2 | * | 4/2010 | Konchitsky | 455/501 |
| 7,787,639 | B2 | * | 8/2010 | Mi et al. | 381/94.5 |
| 7,925,030 | B2 | * | 4/2011 | Holmström et al. | 381/74 |
| 7,936,386 | B2 | * | 5/2011 | Toya et al. | 348/241 |
| 8,014,551 | B2 | * | 9/2011 | Iwano et al. | 381/330 |
| 8,264,270 | B2 | * | 9/2012 | Chung et al. | 327/382 |
| 8,340,320 | B2 | * | 12/2012 | Tseng | 381/94.5 |
| 8,379,873 | B2 | * | 2/2013 | Yamkovoy | 381/81 |

(Continued)

OTHER PUBLICATIONS

Non-Final Office Action mailed Nov. 12, 2010 in U.S. Appl. No. 11/531,914, Christopher Paul, filed Sep. 14, 2006.

(Continued)

*Primary Examiner* — Gerald Gauthier (57) ABSTRACT

Audible crosstalk can be mitigated in a low-cost three-wire device having audio capability and/or voice applications. In some embodiments, a voltage can be introduced in a microphone power supply that is approximately the same as a measured noise voltage and the resulting voltage appearing at a microphone output can be optimized to mitigate the noise voltage and, thus, the presence of crosstalk. In some embodiments, a microphone within a circuit can be isolated to mitigate crosstalk by introducing current into a circuit that is approximately the same as a measured current, but having a flow in an opposite direction.

7 Claims, 9 Drawing Sheets

(56) References Cited

U.S. PATENT DOCUMENTS

| | | |
|---|---|---|
| 8,391,506 B1* | 3/2013 | Paul et al. .................. 381/74 |
| 8,582,787 B2* | 11/2013 | David et al. ................ 381/120 |
| 8,674,753 B2* | 3/2014 | Gu ............................. 327/551 |
| 2001/0053228 A1* | 12/2001 | Jones .......................... 381/71.6 |
| 2004/0234084 A1 | 11/2004 | Isberg et al. |
| 2006/0290519 A1* | 12/2006 | Boate et al. ............... 340/573.4 |
| 2007/0286435 A1* | 12/2007 | Sakamoto et al. ........... 381/87 |
| 2008/0008325 A1 | 1/2008 | Holmstrom et al. |
| 2009/0243553 A1* | 10/2009 | Walley et al. .............. 320/162 |
| 2012/0014532 A1* | 1/2012 | Kimura ...................... 381/71.6 |
| 2012/0155667 A1* | 6/2012 | Nair ........................... 381/71.6 |
| 2012/0163614 A1* | 6/2012 | Asada et al. ................ 381/71.1 |
| 2013/0303102 A1* | 11/2013 | Johnson et al. ............ 455/293 |
| 2014/0185832 A1* | 7/2014 | Schober et al. ............ 381/107 |
| 2014/0236589 A1* | 8/2014 | Paul et al. .................. 704/226 |

OTHER PUBLICATIONS

Final Office Action mailed Jun. 10, 2011 in U.S. Appl. No. 11/531,914, Christopher Paul, filed Sep. 14, 2006.

Notice of Allowance mailed Nov. 9, 2012 in U.S. Appl. No. 11/531,914, Christopher Paul, filed Sep. 14, 2006.

\* cited by examiner

MITIGATING AUDIBLE CROSS TALK

CROSS REFERENCE TO RELATED APPLICATIONS

This Application is a divisional of U.S. patent application Ser. No. 11/531,914 filed on Sep. 14, 2006, the contents of which are expressly incorporated herein by reference in their entirety.

BACKGROUND

Wireless mobile technology has become widespread and is utilized for both personal as well as business use. Mobile devices such as telephones, pagers, personal digital assistants (PDAs), data terminals, etc. are designed to be carried by those who travel from place to place in the daily course of business, for personal reasons, or both. It is also becoming more common for users of mobile devices to utilize such devices in place of conventional wired systems. If fact, many users rely solely on mobile devices to communicate information and no longer have a traditional wired communication system.

The appeal of mobile devices is due in large part to the convenience of having such devices available regardless of where the user may be located (e.g., at home, at work, traveling, out of town, and so on). In such a manner, users can stay in communication with those they need to or want to while mitigating missing a communication. The appeal of mobile devices can also be attributed to lightweight smaller devices, as well as devices that are relatively inexpensive to purchase and maintain.

Since mobile devices are utilized so extensively, a concern has arisen regarding the usage of these devices and performance limitations. For example, a wireless mobile computing device with a three-wire headset for voice applications can produce crosstalk, making communication frustrating, if not difficult. Thus, there is a need to mitigate crosstalk to increase or maintain audio quantity while maintaining a cost-effective device.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with mitigating crosstalk during a communication exchange on a mobile device. In accordance with some aspects presented herein, provided is a system that mitigates audible crosstalk in a three-wire headset. The system can include an evaluation component that evaluates a noise voltage at a common point. Also included is an aggregation component that aggregates a microphone power supply voltage and the evaluated noise voltage. An optimization component is also included that selectively removes a noise voltage from a microphone output voltage. In some embodiments, the optimization component can be a differential amplifier or two analog-to-digital converters.

According to another aspect is a method for mitigating audible crosstalk in a headphone. The method includes sampling a noise signal produced on a common path shared by a microphone and a speaker. The method also includes adding to a microphone power supply a voltage that is approximately equal to the sampled noise signal.

Yet another aspect is a system for mitigating audible crosstalk. The system includes a measurement component that measures a current flowing through a common path in a headset. Also included is an adder component that introduces a current to the common path that is approximately equal to the measured current.

According to another aspect is a method for mitigating audible crosstalk in a mobile device. The method includes sampling a current flowing in a path shared by a microphone and a speaker and inserting into the path a current approximately equal to the sampled current and having a different flow direction.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed embodiments.

Various embodiments will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used.

Figure 1:
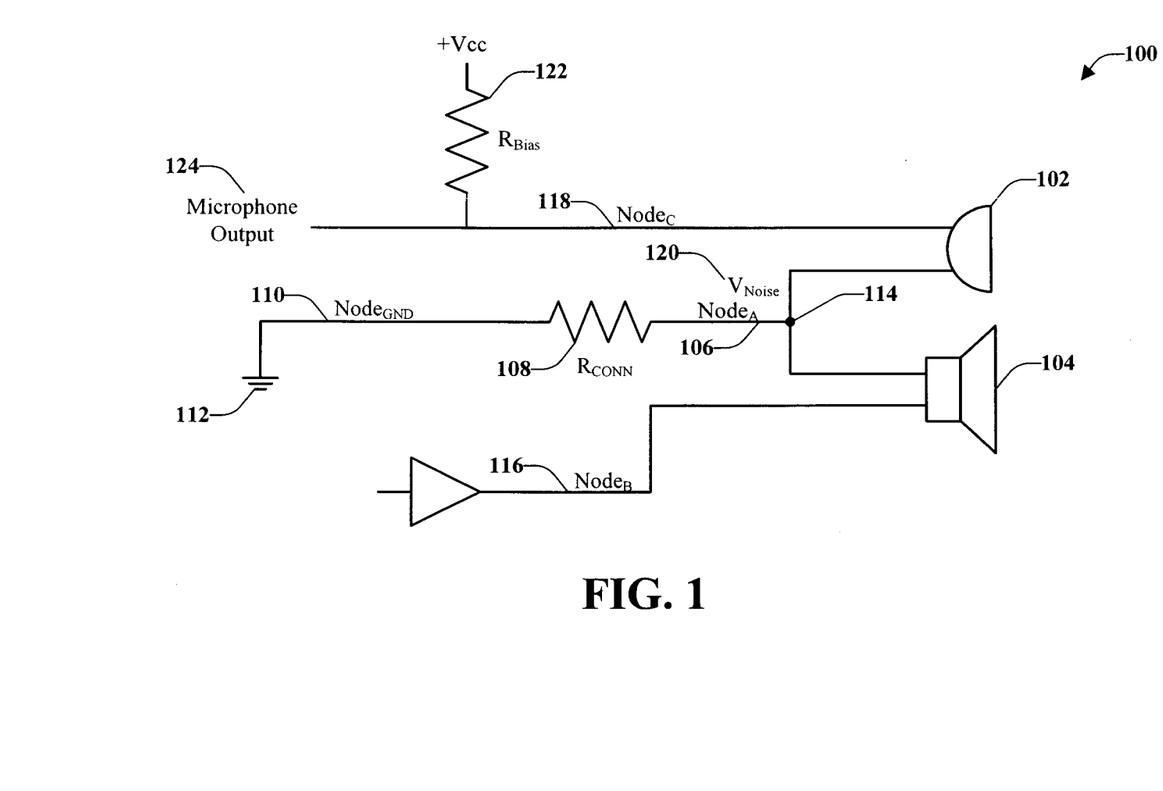
FIG. 1 illustrates a schematic representation of a three-wire mobile device.

Referring initially to FIG. 1, illustrated is an exemplary schematic representation of an inexpensive three-wire device or headset 100. It should be understood that the schematics shown and described herein are for exemplary purposes only and other configurations are possible and can be utilized with the disclosed embodiments. The headset 100 includes a microphone 102 and a speaker 104 that share a common electrical return path or node, labeled $Node_A$ 106, a connection resistor $R_{Conn}$ 108, and a ground path or node, labeled $Node_{GND}$ 110, to ground 112. The headset 100 can employ a three-signal connector having a common connection point 114 on $Node_A$ 106. When the speaker 104 is operated, it generally utilizes a large amount of energy through a speaker path or node, labeled $Node_B$ 116 in comparison to the energy carried in a microphone path or node, labeled $Node_C$ 118. Specifically, crosstalk can develop along $Node_A$ 106 because this node is shared by both the microphone 102 and the speaker 104.

A low value connection resistor $R_{Conn}$ 108 can be present in $Node_A$ 106. This resistor $R_{Conn}$ 108 may not be a physical resistor but an unintended resistance that is a result of the overall device construction. Current used to drive the speaker 104 can flow through $Node_A$ 106 and raise the voltage that is added, at least partially, to the microphone 102 at $Node_A$ 106 because it is a common path. The relatively high currents driven through the headset 100 can develop a noise voltage $V_{Noise}$ 120 in $Node_A$ 106. A portion of Noise Voltage, $V_{Noise}$ 120 can appear as an unwanted signal (e.g., crosstalk) which is applied to the microphone 102 at $Node_A$ 106. For example, if the microphone 102 is considered a resistor of unknown value, the Noise Voltage $V_{Noise}$ 116 creates a voltage divider in $Node_C$ 118, consisting of the microphone 102 and the microphone's bias resistor $R_{Bias}$ 122. Since the resistance of the microphone 102 is unknown, the ratio of the voltage divider produced is unknown. Thus, some unknown fraction of the Noise Voltage $V_{Noise}$ 116 less than one appears in $Node_C$ 118, which can be heard as crosstalk in the Microphone Output 124.

A simple solution to this problem might be to utilize a differential amplifier to subtract the signals Microphone Output 124 and Noise Voltage $V_{Noise}$ 116. However, with this approach, the entire Noise Voltage $V_{Noise}$ 116 signal does not appear in $Node_C$ 118 (e.g., in the Microphone Output 124). This can occur because of the unknown resistance in $Node_C$ 118. Thus, it is unlikely that the portion of Noise Voltage $V_{Noise}$ 116 present in $Node_C$ 118 can be accurately determined. Therefore, it is difficult to ascertain the portion or value of Noise Voltage $V_{Noise}$ 116 that should be subtracted to mitigate the amount of Noise Voltage $V_{Noise}$ 116 produced in $Node_C$ 118, thus, crosstalk might not be mitigated.

In some embodiments, to mitigate crosstalk a four-wire circuit can be utilized wherein the microphone and the speaker have independent circuits and there is no common path. However, implementing a four-wire circuit can increase costs of the device or fail to solve the problem if the unit were used with a common three-wire handset.

Figure 2:
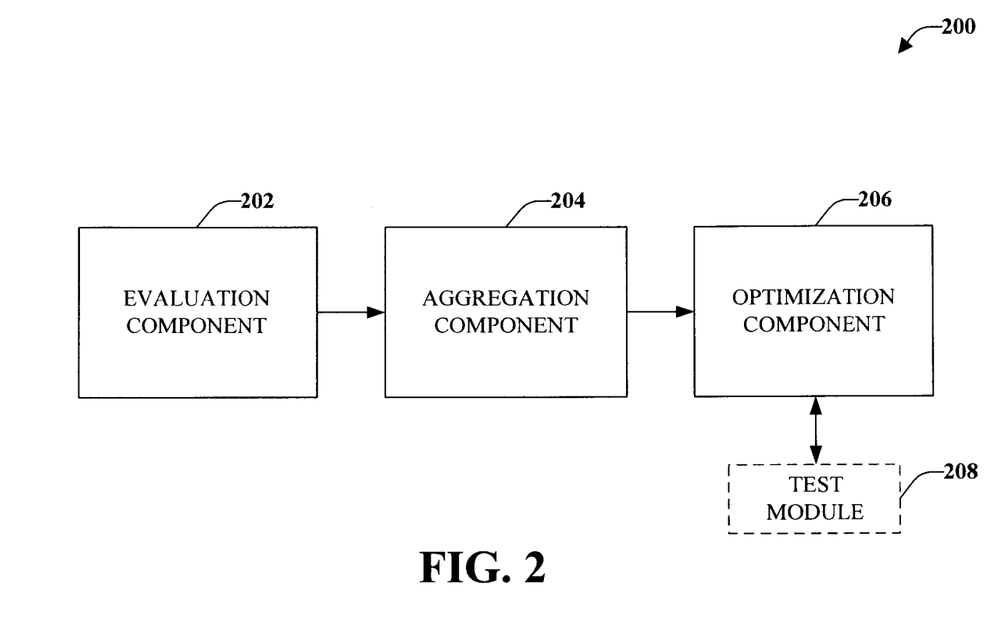
FIG. 2 illustrates an exemplary system for mitigating audible crosstalk in a three-wire mobile device.

FIG. 2 illustrates an exemplary system 200 for mitigating audible crosstalk in a three-wire headset. System 200 can be included in devices that have audio capability and/or voice applications (e.g., desktop computer, laptop computer, portable computer system, cellular telephone, global positioning system, bar code scanner, and so on). Included in system 200 is an evaluation component 202 that can be configured to evaluate one or more voltages at various locations in an electrical circuit. An aggregation component 204 included in the system 200 can be configured to receive information from the evaluation component 202 and provide a voltage that is about the same as the aggregation or sum of the two or more voltages evaluated. This information is communicated to an optimization component 206 that can be configured to selectively remove at least a portion of a voltage from the aggregated voltages (e.g., microphone output) to mitigate crosstalk in a headset.

Specifically, evaluation component 202 can be configured to measure or sample a noise signal at a common point in a three-wire headset, wherein one of the wires is a common ground path. The resistance of the common ground path should have a low value and can be sampled or measured easily. In accordance with some embodiments, evaluation component 202 can evaluate other voltages, such as a microphone power supply voltage, to determine the voltages at different points in the electrical circuit. Thus, in these embodiments, evaluation component 202 can measure the noise signal and the output of the microphone independently or as separate values.

The one or more voltage values measured are communicated to an aggregation component 204 that adds a voltage approximately equal to the noise signal measured to the microphone power supply voltage. The sum of the two signals is utilized in place of the microphone power signal alone to supply power to the microphone, such as across a bias resistor. The noise signal can be applied at the common node of the microphone and a similar value noise signal can be applied at the power supply of the microphone. Thus, regardless of the value of a voltage divider, a similar value appears at both connection points of the microphone. Thus, there is a similar signal in three locations: the common node of the microphone, the microphone power supply, and the microphone output.

Based on these similar signals, there is now a known fraction of noise signal appearing at the microphone output. An optimization component 206 can be utilized to subtract the microphone output from the noise signal itself and mitigate a portion of the noise signal and associated crosstalk. The optimization component 206 can include a differential amplifier that removes the noise signal. However, in accordance with some embodiments, optimization component 206 can comprise two Analog to Digital (A/D) Converters (instead of an operational amplifier). One A/D converter can be placed in a microphone node or path (e.g., microphone output) and one A/D converter can be placed in a common node or path. The noise signal is added to the microphone's power source by the aggregation component 204. In accordance with some embodiments, optimization component 206 is a Digital to Analog Converter (DAC) that can be configured to supply the microphone power supply voltage, which is the sum of the noise and the DC signal. The DAC can provide the voltage when the noise signal is known to a device driving the DAC.

In some embodiments, optimization component 206 can be associated with a test module 208, which can be a separate module or a module included in optimization component 206. While the headset is in operation, the test module 208 can be configured to selectively modify (e.g., ignore or cancel) signals produced by the microphone by evaluating signals coming only from a speaker. Test module 208 can be configured to calibrate the amount of attenuation that appears or it can measure the amount of noise signal that exists at that point and cancel out the noise signal. Sampling performed by test module 208 can vary with frequency. The noise signal can also vary over time due to the age of the components and the type of communication as well as other factors. For example, a voltage signal driven at one frequency can produce a current through the entire circuit that is different in magnitude from the current produced at a different frequency. Thus, sampling performed by test module can be frequency dependent. Such sampling can be performed dynamically and updated at predetermined intervals or when a change is detected.

Figure 3:
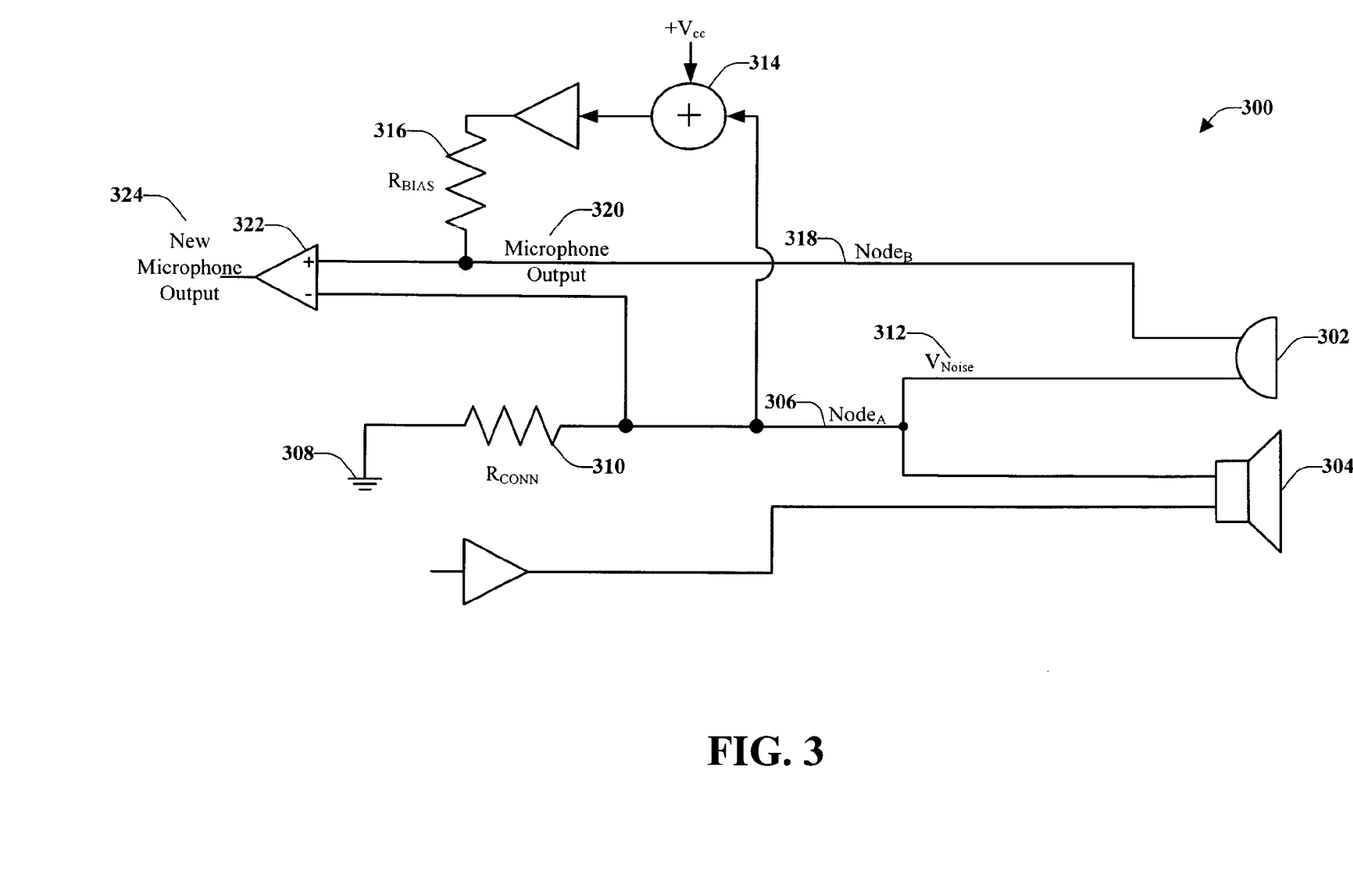
FIG. 3 illustrates an exemplary schematic representation utilizing the one or more embodiments disclosed herein.

FIG. 3 illustrates an exemplary schematic representation of a headset 300 utilizing the one or more embodiments disclosed herein. Headset 300 includes a microphone 302 and a speaker 304 that share a common return path (Node$_A$ 306) to ground 308 and can employ a three-signal connector. Similar to the schematic illustrated in FIG. 1, Node$_A$ 306 can include a connection resistor R$_{Conn}$ 310 and a noise voltage V$_{Noise}$ 312 can develop in Node$_A$ 306 since both the microphone 302 and the speaker 304 share this common path.

To mitigate V$_{Noise}$ 312 in Node$_A$ 306, a voltage that is approximately equal to V$_{Noise}$ 312 can be added to the positive voltage supply+V$_{CC}$ 314 that supplies power to the microphone 302 across a Bias resistor R$_{Bias}$ 316, illustrated as Node$_B$ 318. With a voltage approximately equal to V$_{Noise}$ 312 in Node$_B$ 318, there is little, if any, voltage division of the V$_{Noise}$ 3142 at the Microphone Output 320, which now contains an unattenuated version of V$_{Noise}$ 312. This noise voltage V$_{Noise}$ 312 can be mitigated by using a differential amplifier 322 to subtract approximately all of the noise voltage V$_{Noise}$ 312 from Node$_B$ 318, which can be Microphone Output 320. This cancellation can be apparent at a new Microphone Output 324, thus mitigating crosstalk in the circuit.

It should be noted that the schematic illustrated in FIG. 3 is for exemplary purposes only and the various embodiments are not limited to this exemplary representation as other configurations are possible. For example, rather than utilizing a differential amplifier, a first A/D converter can be placed in a microphone output path or node and a second A/D converter can be placed in a common path or node to mitigate crosstalk. In some embodiments, independent signals (noise signal and microphone output) can be measured and a variable gain control can be placed on the noise signal, which is a summation of the two signals. The volume control can then be adjusted (e.g., by a potentiometer) until an optimal cancellation of the two signals and the noise signal is obtained.

Figure 4:
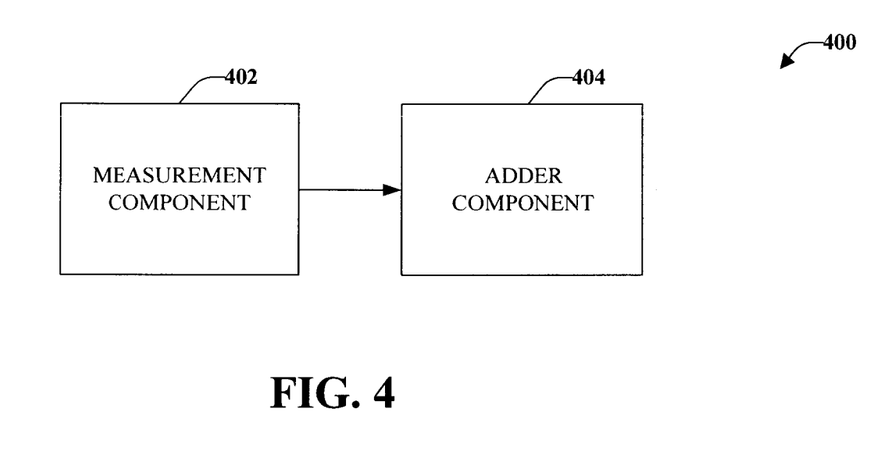
FIG. 4 illustrates another exemplary system for mitigating audible crosstalk in a three-wire mobile device.

FIG. 4 illustrates another exemplary system 400 for mitigating audible crosstalk in a three-wire microphone/headset and can be included in devices that have audio capability and voice applications. System 400 can be configured to isolate a microphone and includes a measurement component 402 that can be configured to measure one or more currents within an electrical circuit and communicate the current measurement to an adder component 404 that can be configured to add or insert a current in a common path to mitigate crosstalk in the headset.

In further detail, measurement component 402 can be configured to measure the current flowing through a common path. This path can be, for example, a path that appears at an output of an amplifier and flows though a headphone and through a common path to ground. With a known current value, system 400 can create a current approximately equal to the measured current, but flowing in an opposite direction. Such current can be added into the circuit by adder component 404. This new current can be applied to a common return path resulting in mitigation of a current flowing in that common return path. This in turn can reduce the voltage in that path to almost zero, thus, mitigating any noise voltage or crosstalk appearing in that circuit and isolating the microphone.

Figure 5:
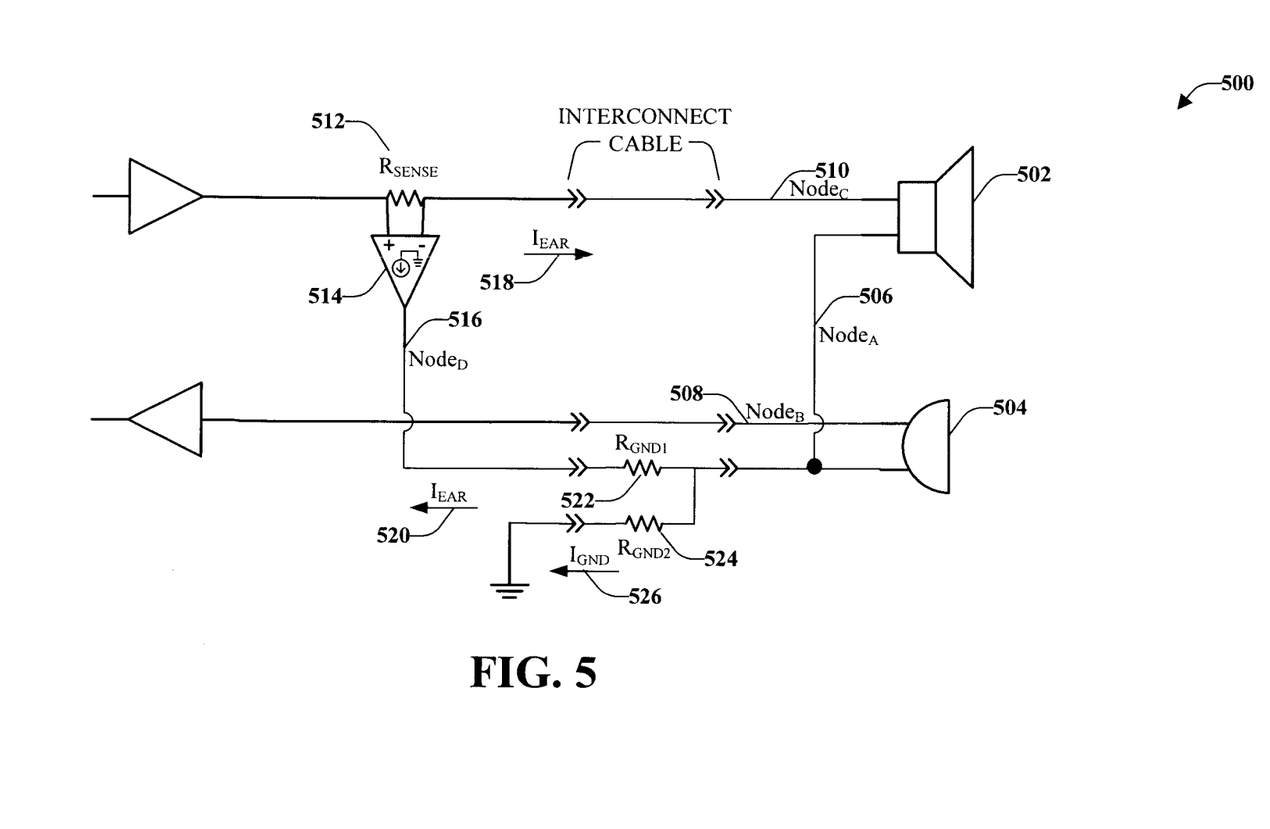
FIG. 5 illustrates another exemplary schematic representation utilizing the one or more embodiments disclosed herein.

FIG. 5 illustrates another exemplary schematic representation of a three-wire microphone/headset 500 utilizing the one or more embodiments disclosed herein. An earpiece 502 and a microphone 504 are connected in a three-wire configuration, represented as Node$_A$ 506, Node$_B$ 508, and Node$_C$ 510. A Sense Resistor R$_{Sense}$ 512 can be inserted in Node$_C$ 510 to drive a Voltage Dependent Current Source 514 whose output, Node$_D$ 516, has a signal approximately equal to the current flowing in Node$_C$ 510, represented as I$_{Ear}$ 518, but which has the opposite direction (or polarity), shown in Node$_D$ 516 as I$_{Ear}$ 520. This facilitates a substantial portion of I$_{Ear}$ 520 flowing through a first ground resistor R$_{GND1}$ 522 and not though a second ground resistor R$_{GND2}$ 524. It should be noted that in some embodiments, R$_{GND1}$ 522 is not included in the circuit but is instead replaced with a wire.

The ground current I$_{GND}$ 526 should then only contain ground current associated with the microphone 502. If the components are matched appropriately, a large portion of the earpiece current that would have flowed through R$_{GND2}$ 524 is instead routed through R$_{GND1}$ 522 where it should not disturb the ground reference point of the microphone 502. This attenuation of the earpiece signal corresponds to an attenuation of the undesired earpiece signal in the microphone 502.

Thus, the microphone ground reference can be configured to remain at approximately the system ground potential. Therefore, the bias supply (not shown) for the microphone 502, should not need modification. However, it should be noted that a relatively high output drive operational amplifier to form the voltage-dependent current source should be utilized. The operational amplifier might consume additional power and, therefore, should source a current equal to that of the earpiece driver.

Figure 6:
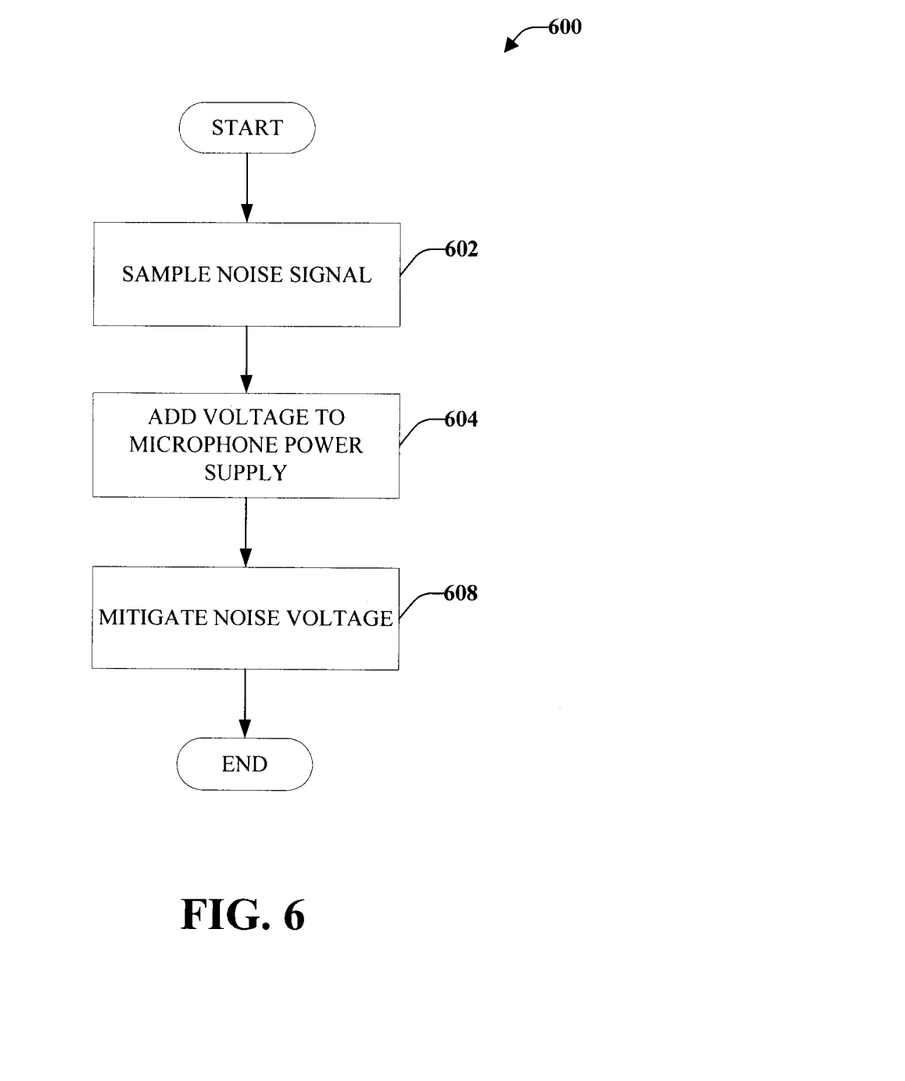
FIG. 6 illustrates a methodology for mitigating audible crosstalk in a three-wire mobile device.

FIG. 6 illustrates a methodology 600 for mitigating audible crosstalk in a three-wire microphone/headset. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Method 600 starts at 602 where a noise signal is sampled or measured. This noise signal can be sampled at a common path portion of a three-wire headset. At 604, the measured or sampled signal is added to a microphone power supply voltage. Thus, the sum of these two signals are substituted for the microphone power signal itself to supply power. There is now a known fraction of the noise signal appearing at the microphone output. At 606, the noise signal is mitigated. Such mitigation can include utilizing a differential amplifier or two A/D converters, as discussed above, or another configuration that can mitigate the noise signal and associated crosstalk in the circuit.

Figure 7:
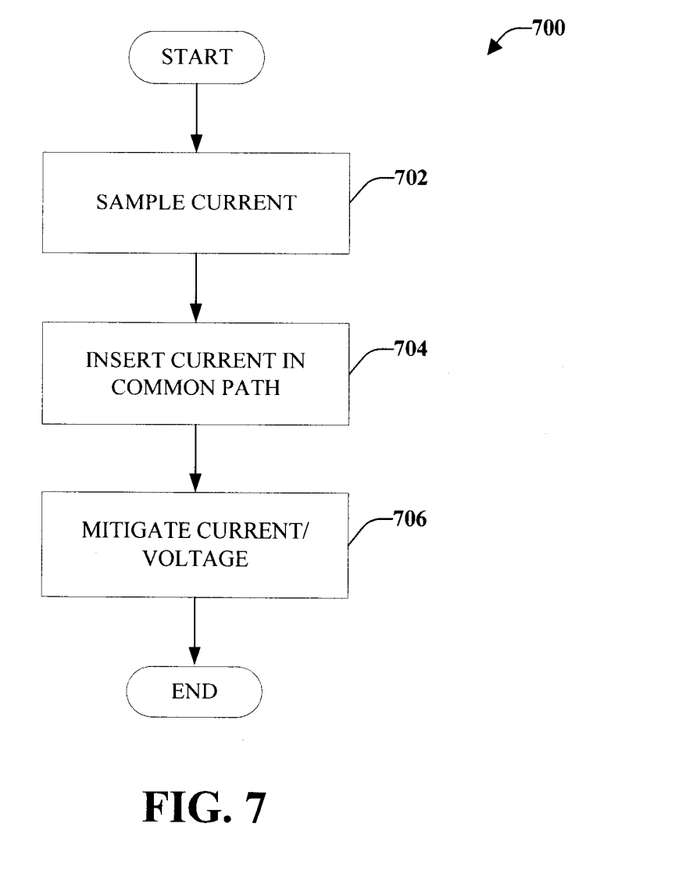
FIG. 7 illustrates another methodology for mitigating audible crosstalk in a three-wire mobile device.

FIG. 7 illustrates another methodology 700 for mitigating audible crosstalk in a three-wire microphone/headset. At 702, the current flowing through a common path is measured. At 704, a current is inserted into the common path to drive the current into a headset ground path. The added current can have a flow in a direction opposite the current flowing in the common path. This results in both the current and voltage being mitigated, at 706, as well as corresponding crosstalk occurring in the circuit. In such a manner, the microphone is isolated within the circuit. This in turn can reduce the voltage in that path to almost zero, thus, mitigating any noise voltage or crosstalk appearing in that circuit and isolating the microphone.

The various embodiments disclosed herein can be utilized for circuits that include a device that supplies a bias signal, which makes it difficult to modify the bias signal. An example of an integrated circuit that supplies a bias signal is a CODEC. Devices, such as a CODEC, provide value added functions to monitor the bias current and to detect the presence of a headset and/or headphone plugged into audio jacks. If a summing amplifier, as discussed above, is utilized in the path, the value added functions of the devices would be lost. Thus, the microphone is isolated as provided in various embodiments disclosed herein.

In addition, the embodiments shown and described herein can employ an artificial intelligence component that can infer when voltage/current testing should occur, the amount of voltage/current to induce in a circuit, or other functions associated with mitigating audible crosstalk. As used herein, the term "inference" refers generally to the process of reasoning about or inferring states of the system, environment, and/or user from a set of observations as captured through events, sensors, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject embodiments.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to predict or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more embodiments can employ classifiers that are explicitly trained (e.g., through a generic training data) as well as implicitly trained (e.g., by observing circuit frequency changes, receiving extrinsic information). For example, SVM's are configured through a learning or training phase within a classifier constructor and feature selection module. Thus, the classifier(s) can be used to automatically learn and perform a number of functions, including but not limited to determining according to a predetermined criteria when to test a voltage and/or current, which voltage and/or current to test, etc. The criteria can include, but is not limited to, how much voltage/current to apply to the circuit, the polarity/flow of the voltage/current, etc.

Figure 8:
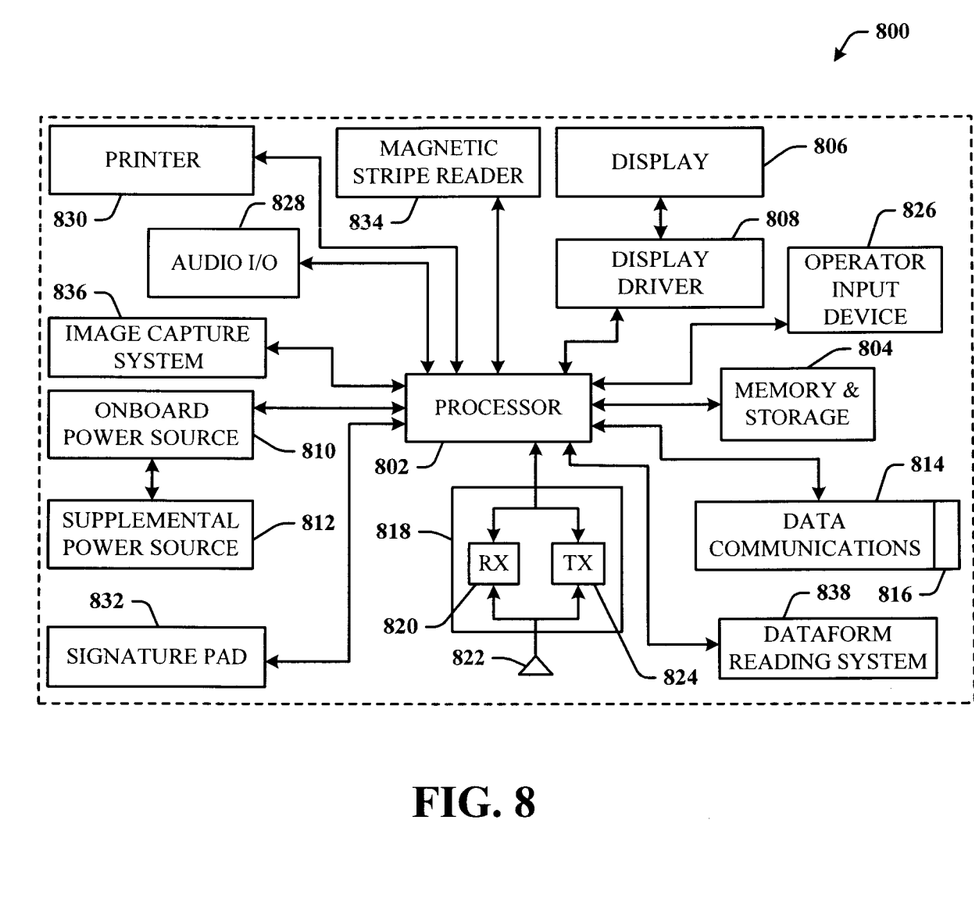
FIG. 8 illustrates a block diagram of a computer operable to execute the disclosed embodiments.
Figure 9:
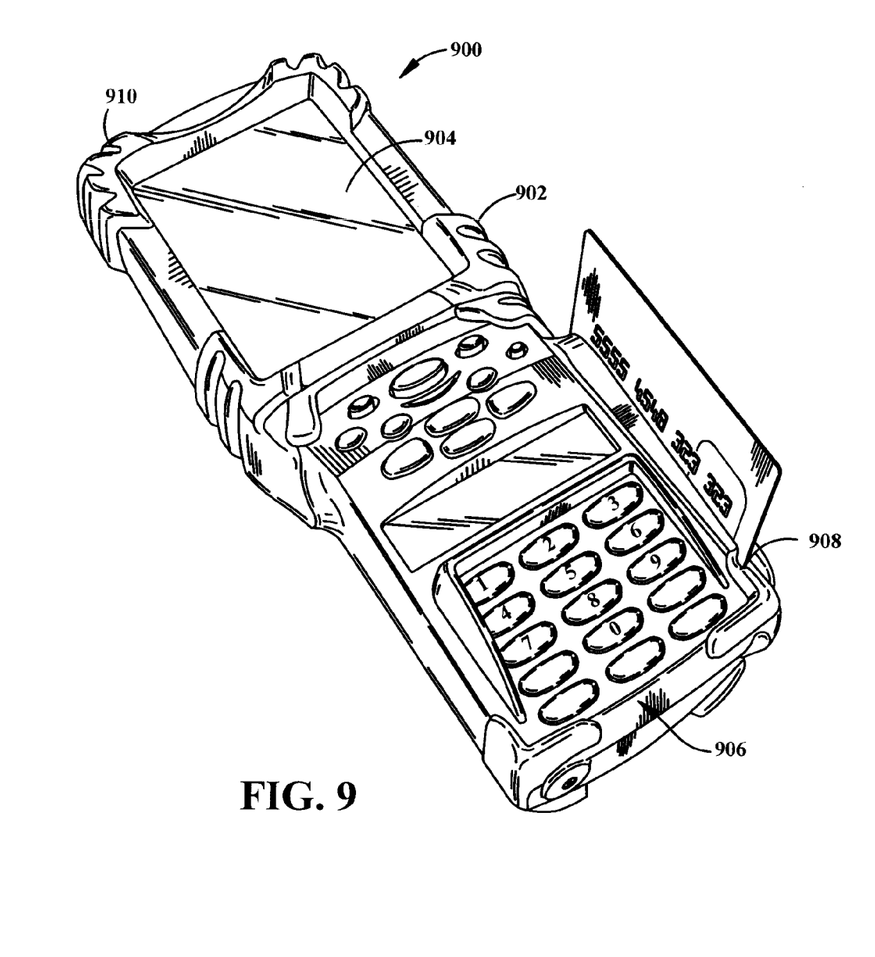
FIG. 9 illustrates an exemplary device operative to execute the one or more embodiments disclosed herein.

Referring now to FIG. 8, illustrated is a schematic block diagram of a portable hand-held terminal device 800 (similar to the portable scanning device 900 as illustrated in FIG. 9) according to one aspect of the invention, in which a processor 802 is responsible for controlling the general operation of the device 800. The processor 802 is programmed to control and operate the various components within the device 800 in order to carry out the various functions described herein. The processor 802 can be any of a plurality of suitable processors. The manner in which the processor 802 can be programmed to carry out the functions relating to the invention will be readily apparent to those having ordinary skill in the art based on the description provided herein.

A memory 804 connected to the processor 802 serves to store program code executed by the processor 802, and serves as a storage means for storing information such as user credential and receipt transaction information and the like. The memory 804 can be a nonvolatile memory suitably adapted to store at least a complete set of the information that is displayed. Thus, the memory 804 can include a RAM or flash memory for high-speed access by the processor 802 and/or a mass storage memory, e.g., a micro drive capable of storing gigabytes of data that comprises text, images, audio, and video content. According to one aspect, the memory 804 has sufficient storage capacity to store multiple sets of information, and the processor 802 could include a program for alternating or cycling between various sets of display information.

A display 806 is coupled to the processor 802 via a display driver system 808. The display 806 can be a color liquid crystal display (LCD), plasma display, or the like. In this example, the display 806 is a ¼ VGA display with sixteen levels of gray scale. The display 806 functions to present data, graphics, or other information content. For example, the display 806 can display a set of customer information, which is displayed to the operator and can be transmitted over a system backbone (not shown). Additionally, the display 806 can display a variety of functions that control the execution of the device 800. The display 806 is capable of displaying both alphanumeric and graphical characters.

Power is provided to the processor 802 and other components forming the hand-held device 800 by an onboard power system 810 (e.g., a battery pack). In the event that the power system 810 fails or becomes disconnected from the device 800, a supplemental power source 812 can be employed to provide power to the processor 802 and to charge the onboard power system 810. The processor 802 of the device 800 induces a sleep mode to reduce the current draw upon detection of an anticipated power failure.

The terminal 800 includes a communication subsystem 814 that includes a data communication port 816, which is employed to interface the processor 802 with a remote computer. The port 816 can include at least one of Universal Serial Bus (USB) and IEEE 1394 serial communications capabilities. Other technologies can also be included, for example, infrared communication utilizing an infrared data port.

The device 800 can also include a radio frequency (RF) transceiver section 818 in operative communication with the processor 802. The RF section 818 includes an RF receiver 820, which receives RF signals from a remote device via an antenna 822 and demodulates the signal to obtain digital information modulated therein. The RF section 818 also includes an RF transmitter 824 for transmitting information to a remote device, for example, in response to manual user input via a user input device 826 (e.g., a keypad) or automatically in response to the completion of a transaction or other predetermined and programmed criteria. The transceiver section 818 facilitates communication with a transponder system, for example, either passive or active, that is in use with product or item RF tags. The processor 802 signals (or pulses) the remote transponder system via the transceiver 818, and detects the return signal in order to read the contents of the tag memory. In one implementation, the RF section 818 further facilitates telephone communications using the device 800. In furtherance thereof, an audio I/O section 828 is provided as controlled by the processor 802 to process voice input from a microphone (or similar audio input device) and audio output signals (from a speaker or similar audio output device).

In another implementation, the device 800 can provide voice recognition capabilities such that when the device 800 is used simply as a voice recorder, the processor 802 can facilitate high-speed conversion of the voice signals into text content for local editing and review, and/or later download to a remote system, such as a computer word processor. Similarly, the converted voice signals can be used to control the device 800 instead of using manual entry via the keypad 826.

Onboard peripheral devices, such as a printer 830, signature pad 832, and a magnetic strip reader 834 can also be provided within the housing of the device 800 or accommodated externally through one or more of the external port interfaces 816.

The device 800 can also include an image capture system 836 such that the user can record images and/or short movies for storage by the device 800 and presentation by the display 806. Additionally, a dataform reading system 838 is included for scanning dataforms. It is to be appreciated that these imaging systems (836 and 838) can be a single system capable of performing both functions.

FIG. 9 is provided to assist in understanding and to provide context to an embodiment of the invention. Specifically, FIG. 9 illustrates an example of a handheld terminal 900 operative to execute the systems and/or methods disclosed herein. It is to be understood that the handheld terminal shown and described is merely exemplary and other devices can be utilized in accordance with the subject disclosure.

The handheld terminal 900 can include a housing 902, which can be constructed from a high strength plastic, metal, or any other suitable material. The handheld terminal 900 can also include a display 904. As is conventional, the display 904 functions to display data or other information relating to ordinary operation of the handheld terminal 900 and/or mobile companion (not shown). For example, software operating on the handheld terminal 900 and/or mobile companion can provide for the display of various information requested by the user.

Additionally, the display 904 can display a variety of functions that are executable by the handheld terminal 900 and/or one or more mobile companions. The display 904 can provide for graphics based alphanumerical information such as, for example, the price of an item requested by the user. The display 904 can also provide for the display of graphics such as icons representative of particular menu items, for example. The display 904 can also be a touch screen, which can employ capacitive, resistive touch, infrared, surface acoustic wave, or grounded acoustic wave technology.

The handheld terminal 900 can further include user input keys 906 for allowing a user to input information and/or operational commands. The user input keys 906 can include a full alphanumeric keypad, function keys, enter keys, etc. The handheld terminal 900 can also include a magnetic strip reader 908 or other data capture mechanism (not shown). An electronic signature apparatus can also be employed in connection with the magnetic strip reader or a telecheck system.

The handheld terminal 900 can also include a window 910 in which a bar code reader/bar coding imager is able to read a bar code label, or the like, presented to the handheld terminal 900. The handheld terminal 900 can include a light emitting diode (LED) (not shown) that is illuminated to reflect whether the bar code has been properly or improperly read. Alternatively, or additionally, a sound can be emitted from a speaker (not shown) to alert the user that the bar code has been successfully imaged and decoded. The handheld terminal 900 can also include an antenna (not shown) for wireless communication with a radio frequency (RF) access point; and an infrared (IR) transceiver (not shown) for communication with an IR access point.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A method for mitigating audible crosstalk in a headphone, comprising:
    sampling a noise signal produced on a common path shared by a microphone and a speaker;
    adding the sampled noise signal to a microphone power supply a voltage;
    substituting the sum of these two added signals for the microphone power signal itself;
    applying the sampled noise signal at a common node of the microphone and at the power supply of the microphone; and
    subtracting the microphone output from the noise signal to mitigate a portion of the noise signal and associated crosstalk.

2. The method of claim 1, further comprising placing a differential amplifier at a microphone output to subtract the noise signal from the microphone output.

3. The method of claim 1, the sampling of the noise signal is performed at predetermined intervals.

4. The method of claim 3, the sampling is dependent upon a frequency of the noise signal.

5. A system for mitigating audible crosstalk in a headset, comprising:
    a measurement component that measures a current flowing through a common path shared by a headphone of the headset; and
    an adder component that introduces a current into the common path to drive the current into a common return path that is approximately equal to the measured current to mitigate the current and voltage associated with crosstalk.

6. The system of claim 5, the introduced current comprising a flow opposite to a flow of the measured current.

7. The system of claim 6, wherein the microphone is isolated within a circuit.

* * * * *